(12) United States Patent
Alexander et al.

(10) Patent No.: US 7,553,801 B2
(45) Date of Patent: Jun. 30, 2009

(54) AUTOMOTIVE ADDITIVE COMPOSITION

(75) Inventors: Mark V. Alexander, Bridgewater, CT (US); Edward T. Turner, Danbury, CT (US); Colin Dilley, Thomaston, CT (US)

(73) Assignee: Honeywell International Inc., Morristown, NJ (US)

( * ) Notice: Subject to any disclaimer, the term of this patent is extended or adjusted under 35 U.S.C. 154(b) by 475 days.

(21) Appl. No.: 11/150,842

(22) Filed: Jun. 10, 2005

(65) Prior Publication Data

US 2005/0288192 A1 Dec. 29, 2005

Related U.S. Application Data

(60) Provisional application No. 60/578,982, filed on Jun. 11, 2004.

(51) Int. Cl.
*C10M 169/04* (2006.01)
*C10L 1/04* (2006.01)
*B01D 24/00* (2006.01)
*B01D 25/00* (2006.01)
*B01D 27/00* (2006.01)
*B01D 29/00* (2006.01)
*B01D 33/00* (2006.01)

(52) U.S. Cl. ............... 508/287; 208/16; 210/416.4
(58) Field of Classification Search ............... 508/287; 208/16; 210/416.4
See application file for complete search history.

(56) References Cited

U.S. PATENT DOCUMENTS

| | | | | |
|---|---|---|---|---|
| 4,075,098 A | * | 2/1978 | Paul et al. ............... | 210/167.02 |
| 5,498,809 A | * | 3/1996 | Emert et al. ............... | 585/13 |
| 5,876,468 A | * | 3/1999 | Moreton ............... | 44/415 |
| 6,238,554 B1 | * | 5/2001 | Martin et al. ............... | 210/109 |
| 2004/0266631 A1 | * | 12/2004 | Burrington et al. ............... | 508/113 |

* cited by examiner

*Primary Examiner*—Walter D Griffin
*Assistant Examiner*—Frank C Campanell
(74) *Attorney, Agent, or Firm*—Cantor Colburn LLP.

(57) ABSTRACT

An automotive additive composition comprising an automotive additive ingredient and a matrix is described. The automotive additive ingredient may be a fuel additive ingredient such as a detergent. The matrix may comprise a gel composition, a solid water removal agent, or a combination comprising one or more of the foregoing matrices. The automotive additive composition may be in the form of a capsule, a gel capsule, or a tablet. Also disclosed is a method of delivering an additive ingredient to a functional fluid of a motor vehicle.

21 Claims, 4 Drawing Sheets

AUTOMOTIVE ADDITIVE COMPOSITION

CROSS REFERENCE TO RELATED APPLICATIONS

This application claims priority upon U.S. Provisional Patent Application 60/578,982, filed Jun. 11, 2004.

BACKGROUND

Fuels for motor vehicles can be compounded with a variety of additives. Alternatively, the additive can be added to the fuel after the fuel is made. Such additives can include, for example deposit control additives for intake valves and/or fuel injectors that are suitable for reducing and/or preventing engine deposits and combustion chamber deposits; corrosion inhibitors; antiknock additives; emulsifiers or demulsifiers; biocides; dyes; pour point depressants and cetane improvers for diesel fuels; and the like. The additives can, for example, be added to the fuel after the fuel is dispensed into the fuel tank of an internal combustion engine. Typically, such additives are dispensed in liquid form.

Automotive or motor vehicle systems such as, for example, fuel injectors, cooling systems, brake systems, transmissions, rear axles, differential gears, and the like, also may be supplied not only with the customary automotive fluids, but also occasionally or constantly with additional additives in order to improve the operating characteristics of the devices, or to restore them to their original performance level which has deteriorated due to wear, soiling and the like. It is customary in this respect to add additional additives to the automotive fluid concerned, such as a windshield washer fluid, an oil, a lubricant, a radiator liquid, a brake fluid, a transmission fluid, a power steering fluid, or a hydraulic fluid. The additives improve the properties of the automotive fluid and/or effect a cleaning and/or provide corrosion protection of the devices coming into contact with this automotive fluid. For example, the additives can effect a sealing of the radiator system, an improvement in the octane number or in the lubricating behavior, and so forth. Such additives may be added in a single process to the automotive or motor vehicle fluid.

With regard to fuel additives, the need for various additives to insure that various engines such as internal combustion engines operate properly and the increased demand for fuel injector cleanliness, for example, as a result of antipollution devices, have made highly desirable additives that can be easily dispensed to the fuel tank by the end-user in effective amounts. For example, a solid fuel additive containing a paraffin wax and a liquid fuel additive comprising the reaction product of a vegetable oil and a polyamine, reacted with an acid, has been described. Another solid or pasty fuel additive containing a compacting agent such as a wax and a polyetheramine detergent has also been described.

While suitable for their intended purpose, there nonetheless remains a need for new automotive or motor vehicle additive compositions, particularly concentrated compositions.

BRIEF SUMMARY

An automotive additive composition comprises an automotive additive ingredient; and a matrix; wherein the composition is in solid or gel form; and wherein the matrix comprises a gel composition, a solid water removal agent, or a combination comprising one or more of the foregoing matrices.

A packaged automotive additive composition comprises an automotive additive composition in gel or solid form disposed within a receptacle, wherein the automotive additive composition comprises an automotive additive ingredient and a matrix; wherein the matrix comprises a gel composition, an anhydride, or a combination comprising one or more of the foregoing matrices.

A method of forming a gel automotive additive composition comprises heating a hydrocarbon-based solvent to a temperature greater than or equal to about the melting temperature of a thermoplastic elastomer; adding the thermoplastic elastomer to the hydrocarbon-based solvent; mixing the thermoplastic elastomer and the hydrocarbon-based solvent to form a molten gel; mixing an automotive additive ingredient and the molten gel to form a molten fuel additive composition; and cooling the molten fuel additive composition to form the gel automotive additive composition. Also disclosed is a method of delivering an automotive additive ingredient to a functional fluid of a motor vehicle system. The method comprises adding an automotive additive ingredient to a functional fluid by compromising the disclosed automotive additive composition so as to cause the release of the automotive additive ingredient into the functional fluid. In one embodiment, the step of compromising the disclosed additive composition comprises immersing the automotive additive composition in the functional fluid. In another embodiment, the step of compromising the additive composition comprises physically rupturing or breaking the additive composition before the entry of the additive composition into the functional fluid.

The above-described and other features will be appreciated and understood by those skilled in the art from the following detailed description, drawings, and appended claims.

BRIEF DESCRIPTION OF THE DRAWINGS

Referring now to the drawings, which are meant to be exemplary embodiments, and wherein the like elements are numbered alike.

DETAILED DESCRIPTION

The term 'automotive' as used herein generally refers to motor vehicles used to transport or move people or objects from one location to another as well as to stationary objects powered by internal combustion engines, turbines, fuel cells, batteries and the like. Illustrative motor vehicles, include, but are not limited to, cars, trucks, boats, ships, construction and building equipment, and the like, whether such vehicles are powered by internal combustion engines, turbines, fuel cells, batteries, or a combination thereof.

Disclosed herein are automotive additive compositions generally comprise an automotive additive ingredient and a matrix. In one embodiment, the automotive additive composition is a fuel additive composition comprising a fuel additive ingredient and a matrix. Other automotive additive compositions are those suitable for addition to an automotive fluid and include, for example, oil treatments, windshield washing fluid, windshield deicing fluid, radiator fluid, brake system fluid, transmission fluid, a lubricating fluid, a hydraulic fluid, a power steering fluid, and the like. As used herein, the term "automotive additive ingredient" includes materials that can be compounded or admixed with the matrix to impart beneficial properties to the automotive additive composition. In one embodiment, the disclosed automotive additive compositions comprise an automotive additive ingredient that is a material added to a motor vehicle system to impart beneficial properties to the motor vehicle system. In another embodiment, the automotive additive composition may be considered to be a delivery package that delivers an active additive ingredient to a functional fluid of a motor vehicle system.

For example, in one embodiment, the automotive additive composition includes those suitable for motor vehicle fuel systems such as fuel treatment compositions and fuel injector cleaner compositions.

In another embodiment, an automotive additive composition includes those suitable for the functional fluid in a motor vehicle radiator system, for example, an agent for the prevention of corrosion and of the formation of deposits in the cooling system, a radiator sealant, a lubricant for the devices through which the coolant flows, such as water pump, thermostat and heater and/or an antifreeze.

In another embodiment, an automotive additive composition includes those suitable for the functional fluid of a motor vehicle brake system or motor vehicle central hydraulic system, for example an agent for maintaining the function of the brake or hydraulic fluid, an agent for cleaning and for corrosion protection of the brake system or of the hydraulic system, and a power steering fluid.

In yet another embodiment, an automotive additive composition includes those suitable for the motor vehicle lubricating system or systems of the engine, transmission, differential gears of a motor vehicle, for example an extreme-pressure lubricant, a viscosity index improver, a cleaning agent and/or a corrosion protection agent.

As further used herein, a matrix is a compound or composition which is utilized to contain and/or to provide rigidity, or to give structural or dimensional stability or support to an automotive additive ingredient. For example, the matrix can permit dispersion of a normally liquid additive in a more viscous liquid, a gel, or a solid form. The matrix can also be used to coat, surround or encapsulate the automotive additive ingredient.

Suitable matrices include, for example, gel compositions, solidifying agents, coating agents, encapsulating compositions, crystallizing agents, binding agents, fillers, solid water removal agents, and the like, and combinations comprising one or more of the foregoing materials. In one exemplary embodiment, the matrix comprises a gel composition, a solid water removal agent, or a combination comprising one or more of the foregoing matrices. These matrix ingredients can be used, for example, in the preparation of gel and/or solid automotive additive compositions. In one embodiment, a suitable matrix will dissolve in the automotive functional fluid to which it is to be added, such as, for example, fuel, hydraulic fluid, oil, and the like.

In one embodiment, the automotive additive composition is a homogeneous mixture of the matrix and the automotive additive ingredient. For example, a molten gel matrix and an automotive additive ingredient can be mixed, poured into a mold, and then cooled to form the homogeneous mixture.

In another embodiment, the automotive additive composition is a heterogeneous mixture, wherein the mixture comprises one or more discrete domains of the matrix, the automotive additive ingredient, or both. For example, a liquid, gel or solid automotive additive ingredient can be surrounded (i.e., encapsulated) with an exterior matrix, e.g., an exterior gel matrix.

In one exemplary embodiment, the additive ingredient will be a flowable liquid while the encapsulating gel matrix will be a stiff matrix that does not flow when placed on a surface. The resulting additive composition may, in this case, be referred to as capsule or cartridge. The encapsulated or enclosed additive ingredient in the capsule or cartridge may be released by either the dissolution of the encapsulating matrix in a functional fluid such as a fuel or alternatively by the physical rupture or breakage of the encapsulating matrix. In one embodiment, such rupture or breakage may be caused by a puncturing means such as a needle or other sharp object or alternatively by crushing caused by increasing pressure or force.

In one embodiment, a core comprising a homogeneous automotive additive composition may be encapsulated with an encapsulating composition such that the resulting automotive additive composition has homogeneous properties in the core and heterogeneous properties in the exterior of the composition. The encapsulating matrix composition may be, for example, a gel composition which may be the same as or different from the matrix material used in the core homogeneous automotive additive composition.

The selection of the matrix material influences the properties of the automotive additive composition. In addition, a coating and/or encapsulating compositions may also affect the properties of the automotive additive composition. For example, the release properties of the automotive additive composition may be controlled from several minutes to days depending on the matrix and/or coating and encapsulating compositions. In addition, the selection of the matrix and/or coating and encapsulating compositions also affects the density of the composition. For example, it some cases it may be desirable for a fuel additive composition to remain at the surface of the fuel tank, while in others it may be advantageous for the composition to sink to the bottom of the fuel tank.

As previously discussed, the automotive additive composition may be in the form of a gel or a solid depending on the selection of the matrix material and the automotive additive ingredient. As used herein, a solid is defined as a non-elastic, friable material and a gel is defined as a colloidal system in which a network of interconnected solid particles spans the volume of a liquid medium. Gels are typically free-standing solids, but are mostly liquid in volume. In one embodiment, the gel may have a Shore hardness of about A0 to about A90. The term "gel" further includes a stiff matrix material that, upon melting, can be molded into a shaped particle such as a sphere. By stiff, it is meant that the gel does not immediately flow when placed on a surface. When in the form of a solid or gel, the automotive additive composition may be in the form of gel spheres, capsules, cartridges, beads, pellets, tablets, grains, powders or nanoparticles and each in the shape of spheres, cubes, and/or cylinders, for example. The present disclosure is not intended to be limited to any particular shape or form. The automotive additive composition in the shape of capsules, cartridges, beads, pellets, tablets, grains, powders or nanoparticles can optionally be further coated encapsulated, or doped as desired.

Although reference is made to a fuel additive composition below, it should be understood that other automotive additive ingredients may be employed in the automotive additive composition depending upon the desired motor vehicle application. Such automotive additive ingredients may be in the solid or liquid form and may be any material intended to provide a beneficial effect to a functional fluid of a motor vehicle system.

A fuel additive ingredient is suitable for use in fuel, for example, in gasoline or in diesel fuel. The fuel additive ingredients may be in liquid or solid form. The fuel additive ingredient can comprise, for example, a detergent; a carrier fluid; a corrosion inhibitor; a lubricant; an agent for reducing soot or for improving exhaust emission; a flow agent; an antifreeze additive; an antiknock additive such as tetraethyl lead, methylcyclopentadienyl manganese tricarbonyl (MMT) or phenolic antiknock compounds, and the like; emulsifiers and demulsifiers to meet the need to exclude or include water; biocides; dyes; pigments; pour point depressants or cetane improvers for diesel fuels; cloud point depressants; wax anti-settling additives; wax crystal modifiers; cold flow improvers; other suitable fuel additive ingredients; and combinations comprising one or more of the foregoing fuel additive ingredients.

In one embodiment, the fuel additive ingredient comprises a detergent. Fuel detergents, for example, clean fuel injectors and intake valves of carbon deposits resulting in improved engine efficiency. Detergents may also help to control varnish, ring zone deposits, and corrosion by keeping insoluble particles in colloidal suspension and, in some cases, by neutralizing acids. Suitable detergents include, but are not intended to be limited to, compounds comprising barium, calcium, or magnesium, such as sulfonates, phosphonates, thiophosphonates, phenates, salicilates, and combinations comprising one or more of the foregoing detergents. Another group of detergents include amine detergents such as polyamines; aliphatic hydrocarbon-substituted amines; polyalkylamines; polyetheramines; polyalkyl succinamides; polyalkyl aminophenols; and a Mannich reaction product derived from an aliphatic hydrocarbon-substituted phenol, an aldehyde, and an amine. Still another suitable amine detergent includes that produced by reacting an acid with the reaction product of a vegetable oil and a polyamine. Various combinations of the foregoing detergents may also be employed.

In another embodiment, the fuel additive ingredient will be an amine detergent comprising a polyamine. Suitable polyamines have the general formula $H_2N(CH_2CH_2NH)_xH$, where x is 2 to about 10, or about 3 to about 6. Representative polyamines include, for example, alkylenepolyamines such as ethylenediamine (EDA); and polyalkylenepolyamines such as diethylenetriamine, tetraethylenepentamine (TEPA), pentaethylenehexamine (PEHA), and the like. Mixtures of two or more polyamines can also be used. More complex polyamines such as polyetheramine (PEA) may also be employed.

In another embodiment, the amine detergent suitable for use as the additive ingredient comprises an aliphatic hydrocarbon-substituted amine such as, for example, polyisobutylene amine (PIBA). An aliphatic hydrocarbon-substituted amine can be derived from a polyolefin having a number average molecular weight of about 500 to about 5,000, or about 700 to about 2,300, or about 750 to about 1,500. In one embodiment, the polyolefin is polyisobutylene. An aliphatic hydrocarbon-substituted amine can be prepared by methods known in the art including chlorination of a polyolefin followed by reaction of the chlorinated polyolefin with an amine or alkanolamine in the presence of a base such as sodium carbonate as described in U.S. Pat. No. 5,407,453. The amine reactant can be a polyamine including alkylenepolyamines such as ethylenediamine, and polyalkylenepolyamines such as diethylenetriamine. The alkanolamine reactant can be a polyamine such as aminoethylethanolamine.

In another embodiment, the amine detergent suitable for use as the additive ingredient comprises a polyetheramine. Suitable polyetheramines can be represented by the formula $R[OCH_2CH(R^1)]_nA$, where R is a hydrocarbyl group having about 4 to about 30 carbon atoms; $R^1$ is hydrogen, a hydrocarbyl group of 1 to about 16 carbon atoms, or a combination thereof; n is 2 to about 50; and A is $—OCH_2CH_2CH^2NR^2R^2$ or $—NR^3R^3$, wherein each $R^2$ is independently hydrogen or hydrocarbyl, and each $R^3$ is independently hydrogen, hydrocarbyl or $—[R^4N(R^5)]_pR^6$ where $R^4$ is $C_2$-$C_{10}$ alkylene, $R^5$ and $R^6$ are independently hydrogen or hydrocarbyl, and p is 1 to 7.

As used herein, the term "hydrocarbyl group" is defined as a monovalent moiety formed by removing a hydrogen atom from a hydrocarbon. Representative hydrocarbyls include saturated or unsaturated hydrocarbons, i.e., alkyl, cycloalkyl, alkenyl, cycloalkenyl, aryl, aralkyl, aralkaryl, aracycloalkyl, aralkenyl, alkaryl, cycloalkaryl, and alkenylaryl groups, as well as mixtures of the foregoing groups. Further, alkyl groups and the alkyl portion of the foregoing groups may be linear or branched unless otherwise indicated.

Suitable polyetheramines can be prepared by initially condensing an alcohol or alkylphenol with an alkylene oxide, a mixture of alkylene oxides, or several alkylene oxides in sequential manner in a ratio of about 1 mole of alcohol or alkylphenol to about 2 to about 50 moles of alkylene oxide to form a polyether intermediate as described in U.S. Pat. No. 5,094,667. The polyether intermediate can be converted to a polyetheramine by amination with ammonia, an amine, or a polyamine as described in published Patent Application EP 310,875. In one embodiment, a polyalkoxylated alcohol or alkylphenol is reacted with acrylonitrile and the resultant nitrile is hydrogenated to form a polyetheramine as described in U.S. Pat. No. 5,094,667.

In another embodiment, the additive ingredient is an amine detergent is a Mannich reaction product derived from an aliphatic hydrocarbon-substituted phenol, an aldehyde, and an amine. The aliphatic hydrocarbon substituent on the phenol can be derived from a polyolefin having a number average molecular weight of about 500 to about 3,000, or about 700 to about 2,300, or about 700 to about 1,500. The polyolefin may be polyisobutylene or a highly reactive polyisobutylene containing greater than or equal to about 70% of its olefinic double bonds as the vinylidene type at a terminal position on the carbon chain. The aliphatic hydrocarbon-substituted phenol can be prepared by methods well known in the art including alkylating phenol with a polyolefin using an acidic alkylation catalyst such as boron trifluoride.

The aldehyde used for the Mannich reaction product can be a $C_1$-$C_6$ aldehyde, such as formaldehyde, which can be used in one of its reagent forms such as paraformaldehyde and formalin.

The amine used for the Mannich reaction product can be a monoamine, polyamine or an organic compound containing at least one NH group that is capable of undergoing the Mannich reaction. Polyamines include alkylenepolyamines such as ethylenediamine and dimethylaminopropylamine and polyalkylenepolyamines such as diethylenetriamine.

The Mannich reaction products can be prepared by methods known in the art including those described in U.S. Pat. Nos. 3,877,889 and 5,697,988 and 5,876,468.

Another suitable amine detergent useful as the additive ingredient is prepared by a two part reaction process wherein a sulfonic acid is reacted with the product mixture obtained from the reaction of a vegetable oil and polyamine. The vegetable oil can be, for example, cotton seed oil, rapeseed oil, peanut oil, corn oil, coconut oil, soybean oil, and the like, and combinations comprising one or more of the foregoing oils. These vegetable oils are mostly long chain triglycerides of long chain monocarboxylic acids containing 10 to 25 carbon atoms per acid moiety. The monocarboxylic acids can be, for example, lauric, myristic, stearic, palmitic, palmitoleic, oleic, linoleic, and the like. Generally, the vegetable oils contain glycerides of a number of kinds of acids. The number and kind can vary with the source vegetable of the oil.

Among the polyamines that can be utilized to make this amine detergent additive are those described above having the general formula $H_2N(CH_2CH_2NH)_xH$, where x is 2 to about 10, or 3 to 6.

The relative amounts of vegetable oil and polyamine employed can be expressed in terms of the molar ratio of triglyceride to nitrogen (N). Broadly, this ratio can be about 0.05:1 to about 1.00:1, or about 0.13:1 to about 0.80:1.

The first reaction, which is between vegetable oil and polyamine, results in a product mix, which is a mixture of glycerol, partly esterified glycerol such as mono- and diglycerides, and amides and imidazolines of the fatty acid. Reaction conditions for the first reaction are: temperature of about 35° C. to about 26° C., or about 120° C. (248° F.) to about 200° C. (390° F.), reaction time of from about 1 hour to about 16 hours, or from about 4 to 9 hours; reaction pressure can be atmospheric pressure but is generally about 0 to about 50 psig when no diluent is present as discussed below. If a diluent is present, the reaction pressure may be that produced by the vapor pressure of the diluent at the temperature employed. It is also preferable to use an inert atmosphere such as, for example, nitrogen over the reaction mixture.

Treatment of the resulting product mix of the first reaction by a second reaction with a strong acid, for example, sulfonic acid, can produce additive ingredients with a good detergency suitable for use in motor vehicle fuels. Suitable sulfonic acids have the general formula $R^7SO_3H$ where $R^7$ is alkyl, aryl, alkaryl, cycloalkyl with about 6 to about 100 carbon atoms. Representative sulfonic acids include dodecylbenzene sulfonic acid, octadecylsulfonic acid, dodecylsulfonic acid, and sulfonic acid oil. The sulfonic acid mixture obtained by treating lubricating stock with sulfur trioxide, for example, mahogany acid and the like, can also be effectively employed in the second reaction.

The second reaction, that is, the treatment of the product mix of the first reaction with a strong acid, is a neutralization reaction, which can take place at atmospheric pressure. The reaction mixture may require stirring to achieve homogeneity, such as stirring from about 1 to about 300 minutes, more generally about 60 and about 120 minutes. The reaction mixture can be treated with heat applied mostly for the purpose of reducing viscosity. The temperature can be about 25° C. (77° F.) to about 100° C. (212° F.), or about 40° C. (104° F.) to about 70° C. (158° F.).

The strong acid such as, for example, sulfonic acid, reacts preferentially with the amino groups remaining in the polyamines after the first reaction.

The first reaction and the second reaction can be carried out in the absence of diluent to produce an undiluted detergent additive. Alternatively, normally liquid hydrocarbon diluents, such as aromatic hydrocarbons having from 6 to 10 carbon atoms per molecule, can be utilized in either the first reaction or the second reaction. However, if such diluents are used in the preparation of the amine detergent additive ingredient, it may be necessary to strip the diluent from the resulting reaction product mixture to produce an undiluted detergent additive. It is preferable to employ an undiluted detergent if a solid form of this amine detergent additive ingredient is desired because the presence of hydrocarbon diluent can weaken or dissolve the matrix utilized in the preparation of such solid form additive ingredients.

The final amine detergent additive ingredient is quite complex and the distribution of possible reaction products depends upon the ratio of vegetable oil to polyamine. However, a large excess of strong acid may be avoided to achieve an amine detergent additive ingredient with a pH more basic than about pH 6.

Fuel detergents, when employed in the automotive additive composition (e.g., a fuel additive composition) as the automotive additive ingredient, comprises about 1 percent by weight (wt %) to about 99.5 wt % of the total weight of the automotive additive composition. In another embodiment, the fuel detergent employed as the automotive additive ingredient, may comprise from about 10 wt % to about 99 wt % of the total weight of the automotive additive composition.

When the detergent comprises PIBA, the PIBA used as the automotive additive ingredients may be present at about 10 wt % to about 50 wt % of the total weight of the automotive additive composition. When the detergent comprises PEA as the fuel additive ingredient, the PEA may present at about 30 wt % to about 80 wt % of the total weight of the automotive additive composition.

The automotive additive ingredient such as the fuel detergents described above, for example, may optionally comprise a carrier fluid. Suitable carrier fluids include, for example, hydrocarbon-based materials such as polyisobutylenes (PIB's), polypropylenes (PP's) and polyalphaolefins (PAO's), all of which may be hydrogenated or unhydrogenated; polyether based materials such as polybutylene oxides (poly BO's), polypropylene oxides (poly PO's), polyhexadecene oxides (poly HO's) and mixtures thereof (i.e. both (poly BO)+(poly PO) and poly BO–(PO)); and mineral oils such as those sold by member companies of the Royal Dutch/Shell group under the designations "HVI" and "XHVI" (trade mark), Exxon Naphthenic 900 SUS mineral oil and high viscosity index oils in general.

A carrier fluid, when employed in the automotive additive composition (e.g., a fuel additive composition), comprises about 1 wt % to about 99.5 wt % of the total weight of the automotive additive composition. In another embodiment, the carrier fluid comprises about 10 wt % to about 50 wt % of the total weight of the automotive additive composition. When the fuel detergent comprises PIBA, the carrier fluid and the PIBA may be present in substantially equal amounts by weight in the automotive additive composition.

In another embodiment, the automotive additive ingredient may comprise a polyolefin polymer and/or their corresponding hydrogenated derivatives in an amount effective for controlling valve deposits in engines. In combination with a detergent, for example, such additives can act as total deposit control additives (TDC) to reduce deposits on fuel injectors, valves, and intake ports of internal combustion engines. Suitable polyolefins that can be employed include polymers prepared from monoolefins and diolefins, or copolymers of either having an average molecular weight of about 500 to about 3,500. Olefins, which can be used to prepare such polyolefin polymers, include ethylene, propylene, butene, isobutene, amylene, hexylene, butadiene, and isoprene. In one embodiment, the polyolefin polymer is a hydrogenated polybutene. The hydrogenated polybutenes can have molecular weights of about 700 to about 1100, or about 800 to about 1000.

The automotive additive ingredient may be or may comprise other additives such as an agent for reducing soot, a pour point depressant, a cetane improver, tetra-alkyl lead compounds, MMT, lead scavengers such as halo-alkanes, dyes, antioxidants such as hindered phenols, corrosion inhibitors such as alkylated succinic acids and anhydrides and derivatives thereof, bacteriostatic agents, auxiliary dispersants, detergents, gum inhibitors, metal deactivators, emulsifiers, demulsifiers, anti-valve seat recession additives such as alkali metal sulphosuccinate salts, anti-icing agents, lubricating agents, flow improvers, anti-wear additives, and combinations comprising one or more of the foregoing additives.

Suitable antioxidants that can be added to the automotive additive composition as the automotive additive ingredient include, for example, metal dithiophosphates and metal dithiocarbonates. One particular antioxidant additive is a phenolic antioxidant, 4,4'-methylene-bis(2,6-di-tertbutylphenol), which is commercially available under the tradename ETHYL 702 (Ethyl Corporation). Antioxidants are particularly advantageous when the automotive additive ingredients or automotive additive compositions comprise a detergent. An antioxidant, when employed in the automotive additive composition (e.g., a fuel additive composition), as part of the automotive additive ingredient may comprise from about 0.01 wt % to about 5 wt % of the total weight of the automotive additive ingredient.

Anti-wear agents, such as sulfur, metal naphthenates, phosphate esters and sulfurized hydrocarbons, etc., may also be used as automotive additive ingredients. One such additive is zinc dibutyldithio-carbamate, which is commercially available as BUTYL ZIMATE (R. T. Vanderbuilt Company).

Flow improvers such as anti-gel and cold flow additives including copolymers of ethylene and vinyl esters of fatty acids with molecular weight of 500-50,000; a tallow amine salt of ophthalmic anhydride; tallow amine salt of dithiobenzoic acid; a 4-hydroxy,3,5-di-t-butyl dithiobenzoic acid; or a ethylene-vinyl acetate copolymers may also be employed as the automotive additive ingredient in the disclosed automotive additive compositions.

The automotive additive composition may also comprise a lubricating agent as the automotive additive ingredient. Lubricating agents include, for example, carboxylic acid polyol esters, dimer acid, polyol esters, castor oil, vegetable oils, fatty methyl esters (e.g., rapeseed), glycol esters, particularly oleates and linoleates (unsaturated). Specific examples of lubricating agents include glycerol monooleate, or fatty formates, or fatty amides or 1,2-alkane diols.

Stabilizers such as, for example, a hydrocarbyl polyoxypropylene di(polyoxyethylene) amine may be employed as the automotive additive ingredient.

Emission (e.g., CO and nitrogen oxide) reducing agents may also be used as the automotive additive ingredient. For example, about 0.01 to about 1.0 ppm of fuel-soluble organometallic platinum compound in an oxygenated solvent such as octyl nitrate can be used as an emission reducing additive. Another example of an emission reducing agents includes dibenzyl cyclooctadiene platinum II in octyl nitrate. Mixtures of alcohol, toluene, and hydrogen peroxide may also be employed. A composition comprising an admixture of about 6% of di-tertiary butyl peroxide, about 1% of tall oil imidazoline, about 0.5% of neo-decanoic acid and the balance being a hydrocarbon solvent carrier thoroughly mixed with the peroxide, imidazoline and acid may also be employed as an emission reducing agent.

Demulsifiers, such as, for example, polyoxyethylene ethers, organic sulfonates, polyoxyalkylene glycols, oxyalkylated phenolic resins, and combinations comprising one or more of the foregoing demulsifiers may be employed as the automotive additive ingredient.

In addition to the automotive additive ingredient, the automotive additive composition also comprises a matrix. In one embodiment, the matrix is soluble in the automotive or motor vehicle functional fluid to which the automotive additive composition is to be added. Illustrative examples of functional fluids include fuels for internal combustion engines, radiator fluids, brake fluids, hydraulic fluids, transmission fluids, power steering fluids, lubricants, and the like. In another embodiment, the matrix need not be soluble in the functional fluid.

The matrix of a fuel additive composition may comprise, for example, a gel composition, a fuel-soluble wax, a binding agent, a tableting aid, a solid water removal agent, a processing aid, or a combination comprising one or more of the foregoing matrices. In one exemplary embodiment, the matrix will comprisea gel composition, a solid water removal agent or a combination comprising one or more of the foregoing matrices. While described with reference to a fuel additive composition, it should be understood that other matrices may be employed, depending upon the particular functional fluid and application.

One suitable matrix for the fuel additive composition comprises a gel composition. In one embodiment, the gel composition comprises a thermoplastic elastomer and a hydrocarbon-based solvent. This polymer, or polymer system, has two phases at the operating temperature, that is, a plastic phase that has a high glass transition temperature and a rubbery (elastomeric) phase that has a low glass transition temperature. The thermoplastic elastomer can comprise a triblock copolymer, radial block copolymer, a multiblock copolymer, or a combination comprising one or more of the foregoing block copolymers, and optionally a diblock copolymer; a physical blend of a plastic and a elastomer; a polymer alloy comprising a plastic and an elastomer; or a combination thereof. Mixtures of block copolymers of the same or different types may also be employed.

Each of the triblock, radial block and/or multiblock copolymers comprises two or more thermodynamically incompatible segments. By the expression thermodynamically incompatible with respect to the polymers, it is meant that the polymer contains two or more incompatible segments, for example a hard and a soft segment. In general, in a triblock polymer, the ratio of segments is one hard, one soft, one hard or an A-B-A copolymer. The multiblock and radial block copolymers can contain a combination of hard and soft segments, provided that there are both hard and soft characteristics. In the optional diblock copolymer, the blocks are sequential with respect to hard and soft segments.

Commercially available thermoplastic rubber type block copolymers are sold under the trademark Kraton® by Kraton Polymers Group. The Kraton® rubber polymers are described as elastomers which have an unusual combination of high strength and low viscosity and a unique molecular structure of linear diblock, triblock and radial copolymers. Each molecule of the Kraton® rubber is said to contain block segments of styrene monomer units and rubber monomer and/or comonomer units. Each block segment may consist of 100 or more monomer or comonomer units. The most common structure is the linear ABA block type; styrene-butadiene-styrene (SBS) and styrene-isoprene-styrene (SIS), which is the Kraton® D rubber series.

A second generation polymer of this general type is the Kraton® G SEBS series. This copolymer comprises a styrene-ethylene-butylene-styrene type (S-EB-S) structure. In one embodiment, the gel composition comprises a polymer of the Kraton® G SEBS series, as the copolymers of this series are hydrogenated and thermally stable. The Kraton® G SEBS rubbers are indicated as being compatible with paraffinic and naphthenic oils and the triblock copolymers are reported as taking up more than 20 times their weight in oil to make a product which can vary in consistency from a "Jell-O®" to a strong elastic rubbery material depending on the grade and concentration of the rubber. Suitable Kraton® G SEBS rubbers include Kraton® G 1650, and Kraton® G 1652.

Also suitable are the Kraton® G SEP polymers which contain styrene-ethylene/propylene blocks. Suitable polymers from this series include, for example, Kraton® G 1702.

The optionally blended diblock polymers include the AB type such as styrene-ethylenepropylene (S-EP) and styrene-ethylenebutylene (S-EB), styrene-butadiene (SB) and styrene-isoprene (SI).

The triblock copolymer may comprise a triblock copolymer of hydrogenated styrene block polymer with 2-methyl-1,3-butadiene and 1,3-butadiene. Such polymers are sold under the trademark SEPTON and manufactured by Kuraray Co., Ltd., Tokyo, Japan. Suitable SEPTON polymers include, for example, SEPTON-4033, SEPTON-4044, SEPTON-4055, SEPTON HG-252, and combinations thereof. High strength, low viscosity, high elongation and thermoplastic behavior at elevated temperatures or in solution, are general characteristics of SEPTON rubbers.

SEPTON-4033, -4044 and -4055 are hydrogenated styrene block copolymer materials. They are available as a polystyrene-b-poly(ethylene-ethylene/propylene)-b-polysytrene (SEEPS) polymer. SEPTON HG-252 is a hydrogenated SEEPS block copolymer having terminal OH groups.

As an alternative to, or in addition to, the block copolymer, the thermoplastic elastomer may comprise a physical blend of the two phases, namely, the plastic phase and the elastomer phase, giving two phases in the blend. The relative proportions of the two phases will determine which would be the continuous phase and which would be the discrete phase. A relatively higher proportion of the plastic component will give a blend with a plastic continuous phase yielding a thermoplastic elastomer, while a higher relative proportion of the elastomer will give plastic reinforced rubber. These blends are available from Advanced Elastomer Systems under the trade name Santoprene®.

Another way of making the thermoplastic elastomer is by melting plastics, such as polystyrene, and elastomers, such as polybutadiene, and creating a polymer alloy with the desired properties of a thermoplastic elastomer. The weight average molecular weight of the plastic component may be about 5,000 to about 100,000, and that of the elastomeric component may be about 10,000 to about 500,000. The alloy may be made in relative proportions of plastic to elastomer of about 1:99 to about 99:1, or about 40:60 to about 60:40.

The hydrocarbon-based solvent of a gel composition suitable for use as the matrix of the additive composition includes, but is not limited to, solvents that are hydrophobic and non-polar. The solvent is generally water insoluble, has a relatively low viscosity, and is substantially free of polymer. The selection of the solvent for use in the gel composition depends on a variety of factors such as the desired properties of the two-phase gel composition such as the viscosity, the desired properties of the end product in which the gel composition may be incorporated such as the viscosity, the processing temperature, the mixing capabilities, the desirability of raw materials, and the like.

Examples of suitable solvents for use in the two-phase gel composition include, but are not limited to, oils, white mineral oils, solvents, base oils, technical mineral oils, synthetic hydrocarbons, solid hydrocarbons, semi-solid hydrocarbons, waxes, petroleum distillates, petrolatums, and combinations thereof. In some embodiments, the solvent may be a paraffinic or a naphthenic oil.

Although the solvent for use in the gel composition may be in the form of a semi-solid or solid, it may be in the form of a liquid for ease of handling in one embodiment.

In one exemplary embodiment, the solvents suitable for use in the gel composition will be compounds that are hydrophobic and non-polar. Examples of suitable commercially available hydrophobic, non-polar solvents include, but are not limited to Excel® 260-HC which is available from Excel Paralubes; Isopar® L, Isopar® M, and Isopar® V which are available from Exxon Mobil; Drakesol® 205, Drakesol® 320, Drakesol® 305, Snow White Petrolatum, Amber Petrolatum, Conosol® C145, Conosol® 200, Conosol® 215, Conosol® 260, and Conosol® 340 which are available from Penreco; Permethyl® 99A, Permethyl® 101A, and Permethyl® 102A which are available from Presperse; and Panalane® L14E which is available from Amoco. Other suitable white mineral oils include, for example, Tufflo oil 6026 and Tufflo Oil 6036 available from Citgo.

The gel composition suitable for use as the matrix in the additive composition may optionally further comprise resin modifiers to aid in processing and/or adjust the viscosity. Suitable resin modifiers include, for example, aromatic end blocked resins such as those based on alpha-methyl styrene and available as Krystalex™ 1200 from Eastman.

The gels may be prepared by blending into the hydrocarbon-based solvent the thermoplastic elastomer, such as one or more triblock, radial block and/or multiblock copolymers, or combinations thereof, in the desired amount. A diblock copolymer may also be optionally included. The amount of each copolymer and the amount of the mixture contained in the hydrocarbon-based solvent determines the final form of the gel. In general, the higher the copolymer content, the stiffer the gel.

The gel may be formed by heating the hydrocarbon-based solvent to greater than or equal to about the melting temperature of the thermoplastic elastomer (e.g., to about 50° C. to about 150° C.) to dissolve the thermoplastic elastomer in the hydrocarbon-based solvent. Mixing may be carried out in a conventional manner, optionally with shear. On cooling, a gel forms.

The percentage of thermoplastic elastomer and hydrocarbon-based solvent in the gel composition can be adjusted to give the desired release properties to the automotive additive composition. When the gel composition is in the form of a homogeneous matrix, the thermoplastic elastomer comprises about 5 wt % to about 50 wt % of the total weight of the gel composition. In another embodiment, the thermoplastic elastomer comprises about 15 wt % to about 40 wt % of the total weight of the gel composition. The hydrocarbon-based solvent comprises about 10 wt % to about 95 wt % of the total weight of the gel composition. In another embodiment, the hydrocarbon-based solvent comprises about 60 wt % to about 85 wt %/o of the total weight of the gel composition.

Optionally, the matrix may be a gel composition employed as a coating or encapsulating composition for the fuel additive composition. In this embodiment, at least a portion of the hydrocarbon-based solvent may be replaced with an additional solvent which is then evaporated to form the coating or capsule. For example, 40 wt % to 90 wt %, or 70 wt % to 80 wt % of the hydrocarbon-based solvent may be replaced with toluene. In this embodiment, the final coating or capsule, i.e., after evaporation of the additional solvent, may comprises about 80 wt % to about 100 wt % of the thermoplastic elastomer and about 0 wt % to about 20 wt % of the hydrocarbon-based solvent.

In another embodiment, a gel composition suitable for use as a matrix comprises a mixture of a polyamide gellant and a solvent. The gellant may be soluble in the solvent at elevated temperatures, and at room temperature after cooling. In one embodiment, the gel may be liquid at elevated temperatures, but solid at room temperature. The gellant provides structure to the gel, although the quality of that structure may be affected by many factors, such as the type and amount of solvent used, and the type and amount of other additives. The solvent binds to the gellant.

Suitable polyamide gellants include polyamides based on terpolymers of simple nylons (such as DuPont ELVAMIDE® 8061, which is a terpolymer of nylon 6, nylon 66, and nylon 610), and polyamides based on complex fatty acids, such as the VERSAMID® series of Henkel Corp. or the UNIREZ® series of Union Camp Corp. In one embodiment, the gellant is VERSAMID® 1655, available from the Henkel Corporation located in Ambler, Pa.

In this embodiment, the solvent comprises about 10 to about 70% by weight of the gel composition, or about 20 wt % to about 70% by weight of the gel composition, or about 35 wt % to about 45% by weight of the gel composition.

Suitable solvents include esters of 12-hydroxystearic acid with a monohydric or polyhydric alcohol, i.e., octylhydroxystearate and derivatives thereof. This class of solvents is referred to herein as "12-hydroxystearic acid esters". Illustrative examples of suitable solvents include, for example, octylhydroxystearate, available as WICKENOL® 171 from Alzo, Inc., located in Matawan, N.J., or CRODAMOL® OHS from Croda, Inc., located in Parsippany, N.J.

The solvent includes "reactive" solvents in the sense that the gellant binds with hydroxy group(s) on the solvent when the two components are mixed. For example, the VERSAMID® 1655 polyamide resin binds to the hydroxy group on the octylhydroxystearate when the two are mixed.

Additional materials that may be included in the gel compositions suitable for use as matrices in the instant compositions include structuring agents, coupling agents, solubilizers, clarifiers, emulsifiers, and plasticizers.

In one embodiment, the gel composition further comprises a structuring agent such as, for example, a crystal forming agent, a crosslinker, or a combination thereof. As used herein, crystal forming agents are materials that have a crystalline structure below their melting points (i.e., typically below 150° F.). Suitable crystal forming agents melt at or below the processing temperature for the gel, and crystallize upon cooling of the gel. In one embodiment, suitable crystal forming agents are those that are soluble in an automotive fluid, e.g., fuel. Exemplary crystal forming agents include, for example, benzoic acid; stearic acid; and anhydrides such as for example, succinic anhydride, phthalic anhydride, benzoic anhydride, acetic anhydride, maleic anhydride, propionic anhydride, naphthalic anhydride, glutaric anhydride, itaconic anhydride, and combinations thereof; and combinations comprising one or more of the foregoing crystal forming agents.

When added to the gel composition, the crystal forming agent comprises about 1 wt % to about 50 wt % of the total weight of the gel composition. In another embodiment, the crystal forming agent comprises about 5 wt % to about 30 wt % of the total weight of the gel composition.

One or more solubilizers may be added to the gel composition in a total amount of 0 wt % to about 15 wt %, or about 7 wt % to about 12 wt %. Solubilizers can improve the solubility of the gellant in the solvent, and thereby improve the clarity of the gellant/solvent blend. Suitable solubilizers include isostearic acid, and branched chain fatty alcohols, such as isostearyl alcohol. Solubilizers may also function as a coupling agent, which couple other components into the solution.

One or more emulsifiers may be added to the gel composition in a total amount of 0 wt % to about 7 wt %, or about 1 wt % to about 2 wt %. Suitable emulsifiers include non-ethoxylated emulsifiers, i.e., emulsifiers that do not have any ethoxyl groups such as sorbitan derivatives. Suitable emulsifiers include sorbitan laurate, sorbitan palmitate, sorbitan stearate, sorbitan tristearate, sorbitan oleate, sorbitan trioleate, and sorbitan sesquioleate. These sorbitan derivatives are commercially available from ICI Americas, and are sold under the trademarks SPAN® and ARLACEL®, with various alphanumeric designations for the different derivatives.

One or more plasticizers may be added to the gel composition in a total amount of 0 wt % to about 10 wt %, or about 1 wt % to about 2 wt %. Plasticizers increase the structural flexibility of the gels. Suitable plasticizers include stearic acid; isopropyl palmitate; isopropyl myristate; linalool; α-terpinol; aldehyde C-14; dioctyl adipate; 1,2 benzenedicarboxylic acid, di-$C_{6-8}$, branched alkyl ester (available commercially as JAYFLEX® 77 from Exxon Chemical Americas, located in Houston, Tex.); 1,2 benzenedicarboxylic acid, di-$C_{8-10}$, branched alkyl ester (available commercially as JAYFLEX®DINP from Exxon Chemical Americas); pentaerythrityl tetracaprylate/tetracaprate (available commercially as CRODAMOL®PTC from Croda, Inc., located in Parsippany, N.J.); and pentaerythrityl tetraisostearate (available commercially as CRODAMOL®PTIS from Croda, Inc.).

In another embodiment, the gel composition suitable for use as matrix further comprises a fuel-soluble wax. Suitable waxes may have a melting point or softening point at of below the processing temperatures. The wax may be a natural wax, such as palm wax, a petrochemical wax exemplified by paraffin wax and vaseline; a chemically modified wax, for example, a hard wax, a synthetic wax, for example polyethylene wax and high molecular weight polyisobutene; or a combination comprising one or more of the foregoing fuel-soluble waxes. The wax can comprise about 1 wt % to about 60 wt % of the total weight of the gel composition.

In one embodiment, the gel compositions may be advantageously employed as a matrix to produce a homogeneous automotive additive composition. When the homogeneous automotive additive composition comprises a gel composition as the matrix, the gel composition comprises about 0.5 wt % to about 99 wt % of the total weight of the automotive additive composition. In another embodiment, the gel composition as a matrix comprises about 0.05 wt % to about 90 wt % of the total weight of the homogeneous automotive additive composition.

In one embodiment, the fuel additive composition comprises about 5 wt % to about 50 wt % of polyisobutylene amine (PIBA) as a first fuel additive ingredient; about 0 wt % to about 50 wt % of a polybutylene oxide carrier as a second fuel additive ingredient; and a gel matrix. In one embodiment, the PIBA and the polybutylene oxide carrier are present in a 1:1 ratio. The composition may comprise about 25 wt % to about 95 wt % of the gel matrix comprising a thermoplastic elastomer and a hydrocarbon-based solvent. This fuel additive is suitable for use, for example, as a gas treatment for a fuel injector cleaner.

In another embodiment, the fuel additive composition comprises about 50 wt % to about 90 wt % of polyether amine (PEA) as the fuel additive ingredient and a gel composition as the matrix. The gel matrix may comprise a styrene block copolymer as previously described in an amount of about 10 wt % to about 30 wt % of the total weight of the fuel additive composition, and a hydrocarbon-based solvent such as Drakesol® 305 to make up the balance of the weight of the fuel additive composition.

In another embodiment, the fuel additive composition comprises a matrix that comprises a solid water removal agent such as a compound that reacts stoichiometrically with water. Anhydrides may have the ability to convert, for example, free water in an automobile gas tank to, for example, a carboxylic acid. Classes of compounds which may react stoichiometrically with water and are suitable for use as a solid water removal agent include cyclopropanes, imines, N-acrylimidazoles, acyl halides, anhydrides, and combinations comprising one or more of the foregoing compounds. In one embodiment, the solid water removal agent comprises an anhydride. Suitable anhydrides include, for example, succinic anhydride, phthalic anhydride, benzoic anhydride, acetic anhydride, maleic anhydride, propionic anhydride, naphthalic anhydride, glutaric anhydride, itaconic anhydride, or a combination comprising one or more of the foregoing anhydrides.

When the matrix comprises the solid water removal agent, the solid water removal agent comprises about 1 wt % to about 99.9 wt % of the total weight of the automotive additive composition. In another embodiment, the solid water removal agent comprises about 5 wt % to about 50 wt % of the total weight of the automotive additive composition.

When the automotive additive composition is a solid, the matrix of the composition may further comprise a tableting aid such as a polymeric tableting aid including, for example, polymers or copolymers of styrene, $C_1$-$C_6$ alkyl-substituted styrenes, and $C_1$-$C_6$ alkyl methacrylates. More specifically, suitable polymeric tableting aids include poly(t-butylstyrene), poly(isobutyl methacrylate), poly(n-butyl methacrylate), or a combination comprising one or more of the foregoing polymers. The amount of tableting aid may be about 0.01 wt % to about 99 wt %, based on the total weight of the additive composition, or about 20 wt % to about 70 wt %, or about 40 wt % to about 60 wt %.

In another embodiment, the matrix further comprises a processing aid in an amount sufficient to improve the properties of the materials during processing. Suitable processing aids include, for example, biphenyl (also known as diphenol; 1,1'biphenyl; phenylbenzene). Processing aids may be employed with both homogeneous and heterogeneous automotive additive compositions.

Homogeneous automotive additive compositions may be put into solid form by methods such as mixing, melting, extrusion, rotary die, pelletizing, tabletizing, and the like, and combinations comprising one or more of the foregoing methods. Gel automotive additive compositions may be put into solid form, for example, by combining an automotive additive ingredient and a gel composition, forming a molten composition, molding the molten additive composition into the desired shape, and cooling the additive composition.

An exemplary method of forming a homogeneous gel automotive additive composition comprises heating a hydrocarbon-based solvent to a temperature greater than or equal to about the melting temperature of a thermoplastic elastomer; adding the thermoplastic elastomer to the hydrocarbon-based solvent; mixing the thermoplastic elastomer and the hydrocarbon-based solvent to form a molten gel; mixing an automotive additive ingredient and the molten gel to form a molten fuel additive composition; and cooling the molten fuel additive composition to form the gel automotive additive composition. The molten fuel additive composition may be cooled in a mold and formed into capsules, beads, pellets, tablets or grains.

In another embodiment, a heterogeneous automotive additive composition comprises a structural element such as a coating, capsule, encapsulating layer, or a skin surrounding an automotive additive ingredient. In one embodiment, the matrix itself may be such a structural element. In another embodiment, such structural elements at least partially surround or encapsulate or coats the automotive additive composition or automotive additive ingredient. Such structural elements may be either fuel-soluble or fuel insoluble. In one embodiment, such structural elements on the automotive additive composition should allow or permit at least some release of the additive ingredient into the fuel or other functional fluid. In addition, such elements may permit immediate release of the automotive additive ingredient to the functional fluid, or may provide controlled release of the automotive additive ingredient to the automotive fluid. Illustrative examples of suitable materials for forming such elements for a heterogeneous automotive additive composition include gel compositions and polyvinyl acetate as described above. The thickness of the coating, capsule, encapsulating layer, or skin is selected to effectively contain the fuel additive ingredient and provide a desired storage capability intended for the application until the desired time or place of release.

The so-formed fuel additive composition may then be dipped or sprayed, for example, with an additional material to form an outer coating or capsule. As previously disclosed, when the structural element such as a coating comprises a gel composition, the matrix material forming the structural element may be the same as or different from the matrix employed in the fuel additive composition.

In another embodiment, the structural element such as an outer coating or capsule comprise a matrix comprising a polyvinyl acetate and a solvent suitable for the polyvinyl acetate. Suitable polyvinyl acetates include ethylene vinyl acetates such as Elvax® 250, Elvax® 150, and Elvax 265® available from Dupont. A suitable solvent for the ethylene vinyl acetate is, for example, toluene.

Another suitable structural element such as a coating may be formed from a polymer dispersed or dissolved in a solvent such as, for example, toluene. Suitable polymers include the thermoplastics and thermoplastic elastomers described previously as suitable for formation of a gel composition.

A gel or solid form automotive additive composition or ingredient may be sprayed with or dipped into a coating composition and dried, optionally with heating.

Alternatively, a solid, gel or liquid automotive composition or ingredient may be disposed within a capsule formed, for example, by capsule formation techniques known in the art. In one embodiment, the structural elements such as a coating or capsule may optionally include a first and/or a second fuel additive ingredient.

Combination coatings and capsules comprising one or more of the foregoing coating compositions are also possible. For example, a gel coating may further comprise an ethylene vinyl acetate.

The homogeneous and heterogeneous automotive additive compositions may further comprise a powdered, granular, or dry outer coating. Suitable outer coatings comprise, for example, stearic acids, benzoic acids, anhydrides, waxes, mold release agents, anti-tack agents, blocking agents and combinations comprising one or more of the foregoing outer coating materials. The outer coating may further comprise a processing aid such as, for example, biphenyl.

Once formed, the gel or solid form automotive additive compositions may be packaged. One suitable receptacle is, for example a clear dispenser tube 2, a illustrated in FIG. 1a. The tube 2 may, for example, comprise an amount of automotive additive composition 4 suitable for a single use. The tube 2 may be fitted with a closing means 6 such as a snap cap or a child proof or resistant cap or other suitable closure device.

The disclosed motor vehicle additive compositions may be used in the disclosed method of delivering an additive ingredient to a functional fluid of a motor vehicle. For example, the disclosed method comprises adding the disclosed additive composition to a functional fluid and compromising the additive composition so as to cause the release of the motor vehicle or automotive additive ingredient into the functional fluid. It is an aspect of the disclosed method that the step of compromising the additive composition may occur before or after the entry of the additive composition into the functional fluid.

In one embodiment, the step of compromising the additive composition comprises dissolving the matrix in the functional fluid of the motor vehicle system, i.e., after the entry of the additive composition into the functional fluid.

In another embodiment, the step of compromising the additive composition comprises physically rupturing or breaking the matrix or additive composition before the entry of the additive composition and/or additive ingredient into the functional fluid. In one embodiment, such rupture or breakage may be caused by a puncturing means such as a needle or other sharp object or alternatively by crushing caused by increasing pressure or force.

Figures 1A, 1B:
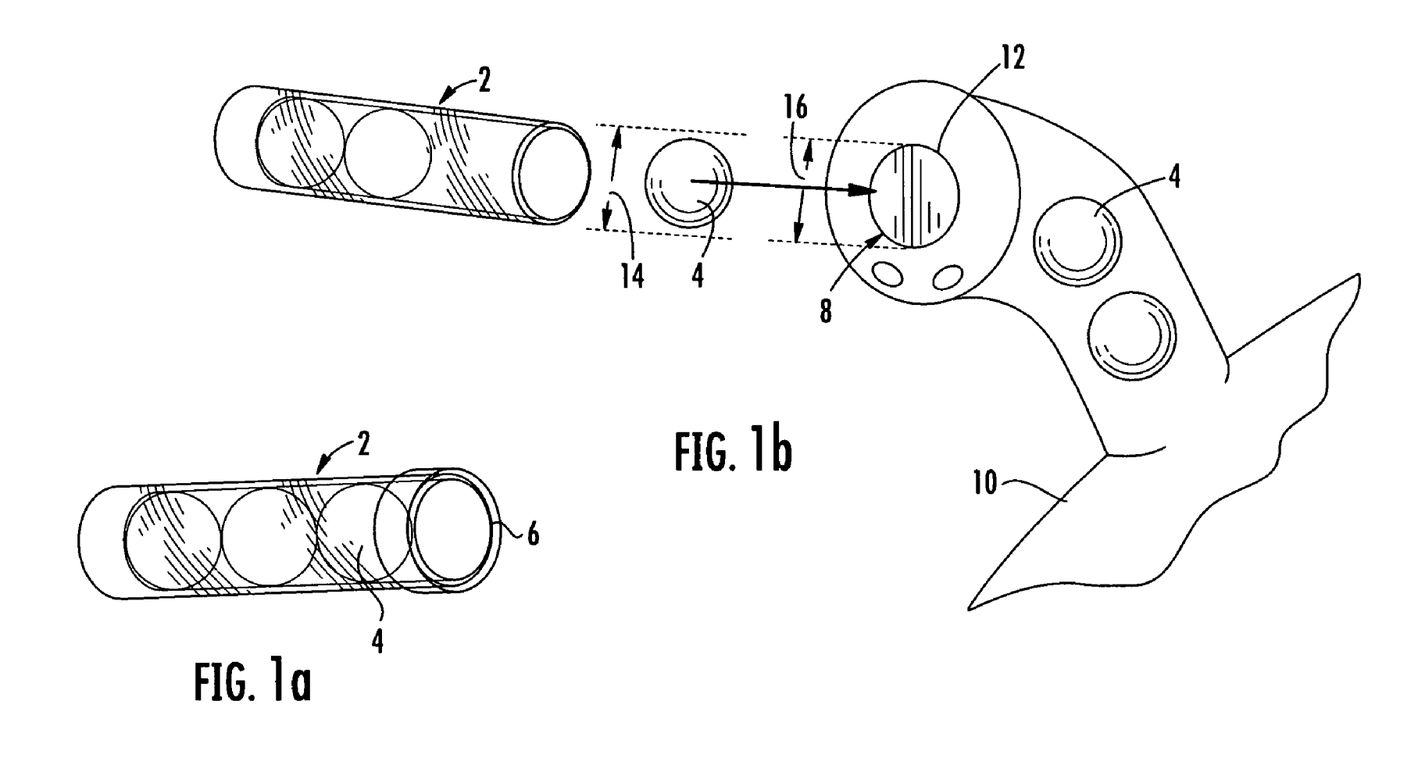
FIG. 1a is a schematic of a dispenser tube containing the disclosed automotive fuel composition.
FIG. 1b is a schematic of one method for dispensing a fuel additive composition to a vehicle fuel tank.

Turning to FIG. 1b, it can be seen that the tube 4 may comprise more than one automotive additive composition 4. In the case of a fuel additive composition for use in fuel tank 10, the tube 2 may dispense the contained additive compositions 4 in spherical geometry directly into the fill pipe opening 8 so that the additive composition 4 simply rolls into the fuel tank 10. Because many fuel tanks have a spring-loaded flap 12 that must be opened before the additive composition 4 is introduced, the dispenser tube 2 or device associated therein may be used to open the flap 12 and thus dispense the additive composition 4.

It will be appreciated that the diameter 14 of tube 2 will generally be less than the diameter 16 of the opening 8. For example, in one non-limiting embodiment, the diameter 14 may be 0.78" while the diameter 16 of opening 8 is about 0.82.

Once the additive composition 4 has been dispensed, the package or tube 2 may be discarded with no residue or disposal issues. In addition, the use of a clear dispenser tube 2 allows for the fuel additive composition to be colored, thus increasing consumer appeal. In another advantageous feature, because of their compact size, several tubes of automotive additive can be stored for future use without taking up excessive space.

Figure 2:
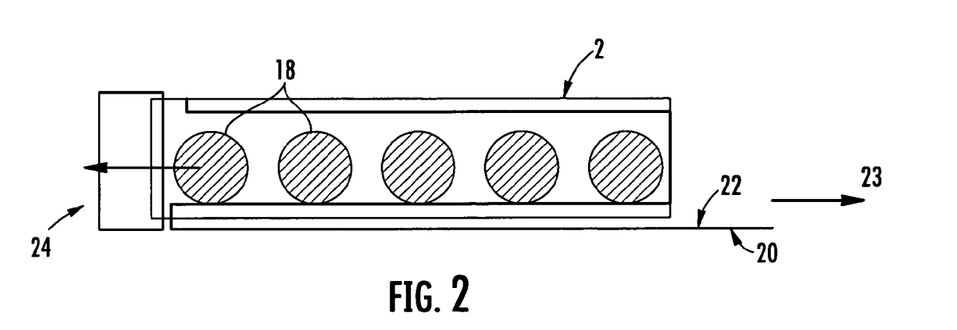
FIGS. 2 and 3 are drawings of embodiments of packaging the disclosed fuel additive composition.

Turning to FIG. 2, in one embodiment, the fuel additive composition may comprise a plurality of capsules, beads, pellets, tablets or grains 18. A receptacle or dispenser tube 2 can further comprise a means to prevent the gel spheres, capsules, beads, pellets, tablets or grains from adhering to each other and/or the dispenser tube. One means 20 is to physically attach the capsules, beads, pellets, tablets or grains 18 to a solid support such as a ribbon 22. The gel spheres, capsules, beads, pellets, tablets or grains 18 may then be dispensed by pulling the ribbon 22 from the tube 2 in a direction 23 such that the automotive additive capsules, beads, pellets, tablets or grains are directly dispensed into, for example, a fuel tank.

Figure 3:
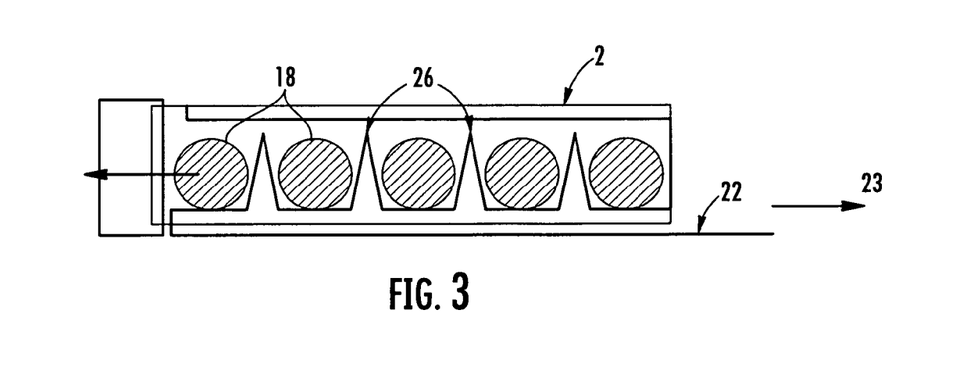

In another embodiment as illustrated in FIG. 3, the gel spheres, capsules, beads, pellets, tablets or grains 18 may be physically separated by a divider 26. The divider 26 may or may not be dispensed into the gas tank 10 with the automotive additive composition 4.

Figure 5:
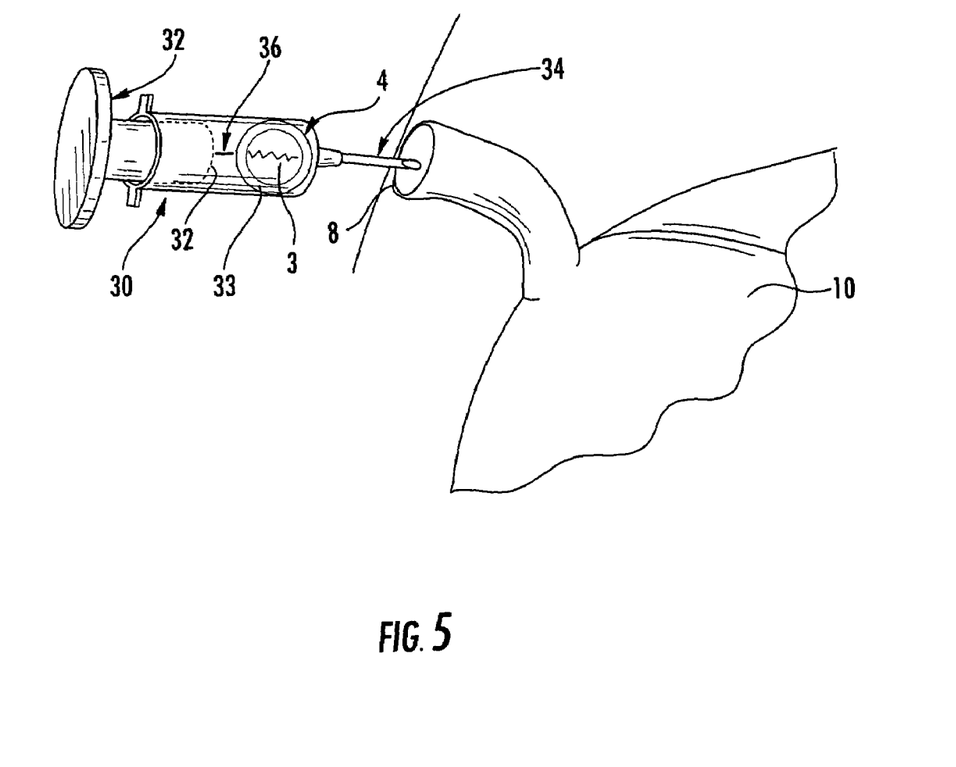
FIG. 5 is a schematic of another embodiment for dispensing a fuel additive composition to a vehicle fuel tank.

In another embodiment, as illustrated in FIG. 5, the automotive additive ingredient 3 of the automotive additive composition 4 may be released into a fuel tank 10 through fill pipe opening 8. In this embodiment, the fuel additive composition 4 resides in a syringe 30 fitted with a plunger 32. Upon depression of the plunger 30, the encapsulating layer 33 of the additive composition 4 is crushed or ruptured to release the fuel additive ingredient 3. The fuel additive ingredient 3 may then flow into a directing means 34 such as a needle or narrow tube to enter fill pipe opening 8.

Alternatively, the plunger 32 might also be equipped with a puncturing means 36 such as needle or other sharp object to pierce or puncture the layer 33 of the additive composition 4 and thus release the additive ingredient 3 into the directing means 34.

The invention is further illustrated by the following non-limiting examples.

EXAMPLES 1-7

Fuel Treatment Composition

A homogeneous fuel treatment composition comprises PIBA detergent and a polybutylene oxide carrier fluid as fuel additive ingredients, and a gel matrix comprising a thermoplastic elastomer and a hydrocarbon-based solvent in the amounts shown in Table 1. The PIBA, obtained from Ethyl, is a mixture of PIBA and aromatic solvent. In Table 1, actual percentage of PIBA in the compositions is listed.

The homogeneous fuel treatment compositions were formed by heating the hydrocarbon-based solvent to the temperature listed in Table 1; adding the thermoplastic elastomer to the hydrocarbon-based solvent; mixing the thermoplastic elastomer and the hydrocarbon-based solvent to form a molten gel; mixing the automotive additive ingredients and the molten gel to form a molten fuel additive composition; disposing the molten composition into a mold; and cooling the molten fuel additive composition to form the gel automotive additive composition.

TABLE 1

| | Example No. | | | | | | |
|---|---|---|---|---|---|---|---|
| Component | 1* wt % | 2 wt % | 3 wt % | 4 wt % | 5 wt % | 6 wt % | 7 wt % |
| Detergent- PIBA | 10.18 | 10.18 | 10.18 | 10.18 | 10.18 | 10.18 | 16.97 |
| Carrier fluid- butylene oxide | 11.28 | 11.28 | 11.28 | 11.28 | 11.28 | 11.28 | 18.8 |

TABLE 1-continued

| Component | 1* wt % | 2 wt % | 3 wt % | 4 wt % | 5 wt % | 6 wt % | 7 wt % |
|---|---|---|---|---|---|---|---|
| Thermoplastic elastomer-Kraton G 1650 | 9.0 | 15.0 | 11.17 | | | | |
| Thermoplastic elastomer-Krayton G 1702 | — | — | 3.99 | | | | |
| Thermoplastic elastomer-Krayton G 1652M | | | | 22.0 | 16.0 | 22.0 | 30.0 |
| Hydrocarbon-based solvent-Drakesol 305 | 65.96 | 59.96 | 59.8 | 52.96 | 54.96 | 51.86 | |
| Hydrocarbon-based solvent Tufflo oil | | | | | | | 28.27 |
| Resin modifier-Krystalex | | | | | 4.0 | 1.10 | |
| Processing Temperature: | 200° F. | 216° F. | 220° F. | 245° C. | 235° C. | 255° F. | 270° F. |

*Amounts may not add up to 100%. The difference between the total weight percent and 100 weight percent is aromatic solvent.

Examples 1-7 all formed free standing, stable gels. Different types and amounts of the thermoplastic elastomer and hydrocarbon-based solvent in the gel composition, and the addition of a resin modifier, allowed the production of a variety of suitable fuel additive compositions.

EXAMPLES 8-11

Fuel Injector Cleaner Composition

A homogeneous fuel injector cleaner composition comprises PIBA detergent and polybutylene oxide carrier fluid as fuel additive ingredients, and a gel matrix comprising a thermoplastic elastomer and a hydrocarbon-based solvent. The compositions were formed by the same method as Examples 1-7.

TABLE 2

| Component | 8 wt % | 9 wt % | 10 wt % | 11 wt % |
|---|---|---|---|---|
| Detergent- PIBA | 34.4 | 34.4 | 25.8 | 25.8 |
| Carrier fluid-butylene oxide | 28.13 | 28.13 | 21.1 | 21.1 |
| Thermoplastic elastomer-Kraton G 1650 | — | — | — | — |
| Thermoplastic elastomer-Krayton G 1652M | 30.0 | 20.0 | 25.0 | 30.0 |
| Hydrocarbon-based solvent-Drakesol 305 | 7.47 | 17.47 | 28.10 | 23.10 |
| Processing Temperature: | 280° F. | 270° F. | 275° F. | 290° F. |

Examples 8-11 all formed free standing, stable gels. Different amount of amine detergent as the additive ingredient allowed the production of a variety of suitable fuel additive compositions.

EXAMPLES 12-13

A homogeneous fuel injector cleaner composition comprises PEA detergent and polybutylene oxide carrier fluid as fuel additive ingredients, and a gel matrix comprising a thermoplastic elastomer and a hydrocarbon-based solvent. PEA was purchased from Ethyl. The compositions were formed by the same method as Examples 1-7. Example 12 is an uncoated fuel additive composition. Examples 13 and 14 are identical to composition 12, except that they are coated. The coatings were produced by dipping a spherical fuel additive gel composition into a molten coating composition.

TABLE 3

| | 12 wt % | 13 wt % | 14 wt % |
|---|---|---|---|
| Base Composition Component | | | |
| Detergent- PEA | 57.65 | 57.65 | 57.65 |
| Thermoplastic elastomer- Kraton G 1650 | 15.03 | 15.03 | 15.03 |
| Hydrocarbon-based solvent- Drakesol 305 | 27.32 | 27.32 | 27.32 |
| Coating Composition Component | | | |
| Thermoplastic elastomer- Krayton G 1652M | | 12.37 | 12.37 |
| Hydrocarbon-based solvent- Drakesol 305 | | 7.03 | 7.03 |
| Resin modifier- Krystalex | | 9.65 | — |
| Ethylene vinyl acetate- Elvax 250 | | — | 9.65 |
| Additional solvent- toluene | | 70.43 | 70.43 |
| Dye | | 0.52 | 0.52 |
| Processing Temperature: | 280° F. | 270° F. | 275° F. |

In Examples 13 and 14, both coating compositions exhibited, upon drying, a firm, flexible dry shell that contained all of the components listed in Table 3 except the solvent.

EXAMPLE 15

Dissolution of Gel Compositions in Gasoline

Figure 4:
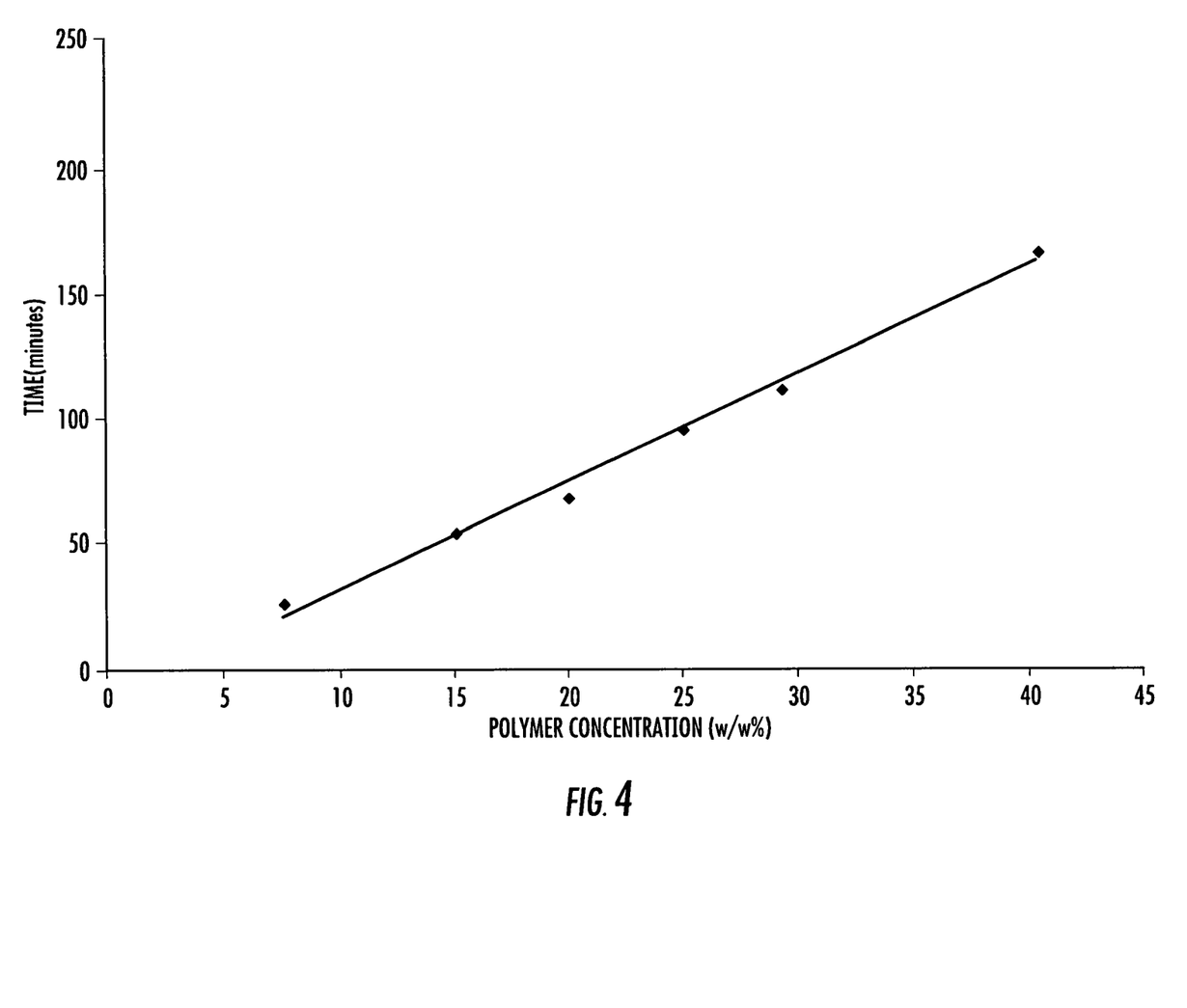
FIG. 4 is a dissolution profile of gel compositions in gasoline.

The solubility of a gel composition in gasoline was tested as a function of the wt % of the thermoplastic elastomer in the gel composition. In this experiment, gel compositions comprising various percentages of Kraton G 1652 and Drakesol 305 were formed by melting the Drakesol 305 to a temperature greater than or equal to the temperature of the Kraton G 1652. The molten gel compositions were solidified in a mold and then visually observed for dissolution in gasoline at room temperature without stirring. The time at which complete dissolution was observed was recorded. As shown in FIG. 4, increasing the percentage of thermoplastic elastomer from about 7 wt % to about 43 wt % increased the dissolution time from about 30 minutes to about 160 minutes. An increase in the dissolution time was also observed for increasing thermoplastic elastomer when the Drakesol 305 was substituted with Tufflo Oil 6036 (Data not shown).

In another experiment, the dissolution of a composition of Example 7 was studied with and without the coating of Example 13. The uncoated fuel additive composition exhibited a dissolution time if about 160 minutes, while the coated composition exhibited a dissolution time of about 110 minutes. For comparison, the gel composition with no fuel additive ingredients has a dissolution time of about 100 minutes. Thus, the presence of the fuel additive ingredient affects the dissolution of the gel composition by less than 2-fold.

An automotive additive composition comprising an automotive additive ingredient and a matrix has been described. The composition may be a solid or a gel in the form of capsules, beads, pellets, tablets or grains. One advantage of the compositions is that these automotive additive forms are easier to store than large bottles of liquid automotive additive. A large fraction of many liquid automotive additives is solvent which has little or no performance function, and has both cost and safety issues. The disclosed compositions may thus be less expensive, cleaner, safer, more convenient to use than conventional liquid automotive additive compositions.

All ranges disclosed herein are inclusive and combinable. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. An automotive additive composition, comprising:
a fuel additive ingredient; and
a matrix comprising a thermoplastic elastomer and a hydrocarbon-based solvent;
wherein the composition is in solid or gel form, and wherein the matrix comprises a gel composition;
wherein the automotive additive composition is a fuel additive composition;
wherein the thermoplastic elastomer is soluble in the fuel;
wherein the automotive additive composition is free of a coating or comprises a coating;
wherein the coating comprises the thermoplastic elastomer and is soluble in the fuel; and
wherein a dissolution time of the automotive additive composition in the fuel is less than or equal to about 160 minutes.

2. The automotive additive composition of claim 1, in the form of gel spheres, capsules, beads, pellets, tablets, grains, or a combination comprising one or more of the foregoing forms.

3. The automotive additive composition of claim 1, in the form of a homogeneous composition.

4. The automotive additive composition of claim 1, in the form of a heterogeneous composition, wherein the gel composition encapsulates the fuel additive ingredient.

5. The automotive additive composition of claim 1, wherein the thermoplastic elastomer comprises a triblock copolymer, radial block copolymer, a multiblock copolymer, or a combination comprising one or more of the foregoing block copolymers, and optionally a diblock copolymer; a physical blend of a plastic and a elastomer; a polymer alloy comprising a plastic and an elastomer; or a combination thereof 6. The automotive additive composition of claim 1, wherein the hydrocarbon-based solvent is an oil, a mineral white oil, a base oil, a technical mineral oil, a synthetic hydrocarbon, a solid hydrocarbon, a semi-solid hydrocarbon, a wax, a petroleum distillate, a petrolatum, or a combination comprising one or more of the foregoing solvents.

7. The automotive additive composition of claim 1, wherein the gel composition further comprises a crystal-forming agent.

8. The automotive additive composition of claim 1, wherein the gel composition further comprises a fuel-soluble wax.

9. The automotive additive composition of claim 1, wherein the gel composition further comprises an anhydride.

10. The automotive additive composition of claim 1, wherein the gel composition further comprises an ethylene vinyl acetate.

11. The automotive additive of claim 1, wherein the fuel additive ingredient comprises an amine detergent.

12. The automotive additive composition of claim 11, wherein the amine detergent is a polyamine, an aliphatic hydrocarbon-substituted amine, a polyalkylamine, a polyetheramine, a polyalkyl succinamide, a polyalkyl aminophenol, a product produced by reacting an acid with the reaction product of a vegetable oil and a polyamine, or a combination comprising one or more of the foregoing amine detergents.

13. The automotive additive composition of claim 12, wherein the automotive additive ingredient further comprises a polyolefin polymer, a carrier fluid, an agent for reducing soot, a tetra-alkyl lead compound, methylcyclopentadienyl manganese, a lead scavenger, a dyes, an antioxidant, a corrosion inhibitor, a bacteriostatic agent, an auxiliary dispersant or detergent, a gum inhibitor, a metal deactivator, an emulsifier, a demulsifier, an anti-valve seat recession additive, an anti-icing agent, a lubricating agent, a flow improver, an anti-wear additive, a pour point depressant, a cetane improver, a cloud point depressant; a wax anti-settling additive; a wax crystal modifier; a cold flow improver; or a combination of one or more of the foregoing additives.

14. The automotive additive composition of claim 1, comprising the coating.

15. The automotive additive composition of claim 14, wherein the coating further comprises a second automotive additive ingredient.

16. The automotive additive of claim 1, wherein the composition further comprises a solid water removal agent.

17. The automotive additive composition of claim 16, wherein the composition is in solid form.

18. The automotive additive composition of claim 17, wherein the solid water removal agent is succinic anhydride, phthalic anhydride, benzoic anhydride, acetic anhydride, maleic anhydride, propionic anhydride, naphthalic anhydride, glutaric anhydride, itaconic anhydride, or a combination comprising one or more of the foregoing anhydrides.

19. A packaged automotive additive composition comprising:
the automotive additive composition of claim 1, disposed within a receptacle.

20. The packaged automotive additive composition of claim 19, wherein the receptacle is a clear, plastic tube.

21. The automotive additive composition of claim 1, comprising about 5 to about 50 percent by weight of the thermoplastic elastomer, based on the total weight of the automotive additive composition.

* * * * *